US011799807B2

(12) United States Patent
Zheng et al.

(10) Patent No.: US 11,799,807 B2
(45) Date of Patent: Oct. 24, 2023

(54) MAIL PROCESSING METHOD AND APPARATUS, DEVICE AND MEDIUM

(71) Applicant: BYTEDANCE INC., Los Angeles, CA (US)

(72) Inventors: Wentao Zheng, Los Angeles, CA (US); Bo Li, Los Angeles, CA (US); Justin Jia-Zhao Lim, Los Angeles, CA (US); Jie Zhu, Beijing (CN)

(73) Assignee: BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/726,810

(22) Filed: Apr. 22, 2022

(65) Prior Publication Data
US 2022/0247702 A1 Aug. 4, 2022

Related U.S. Application Data

(63) Continuation of application No. PCT/CN2021/101337, filed on Jun. 21, 2021.

(30) Foreign Application Priority Data

Jun. 28, 2020 (CN) .......................... 202010600626.1

(51) Int. Cl.
G06F 15/16 (2006.01)
H04L 51/04 (2022.01)
H04L 61/5069 (2022.01)
H04L 51/48 (2022.01)
(Continued)

(52) U.S. Cl.
CPC ........... H04L 51/04 (2013.01); G06Q 10/107 (2013.01); H04L 51/48 (2022.05); H04L 61/5069 (2022.05); H04W 4/08 (2013.01)

(58) Field of Classification Search
CPC ..... H04L 51/04; H04L 51/48; H04L 61/5069; H04L 61/301; H04L 2101/37; G06Q 10/107; H04W 4/08
See application file for complete search history.

(56) References Cited

U.S. PATENT DOCUMENTS

2009/0037542 A1\* 2/2009 Chen .................... G06Q 10/107
709/206
2010/0250693 A1 9/2010 Zheng et al.
(Continued)

FOREIGN PATENT DOCUMENTS

CN 101072192 A 11/2007
CN 100505707 C 6/2009
(Continued)

OTHER PUBLICATIONS

International Search Report dated Sep. 23, 2021 in International Patent Application No. PCT/CN2021/101337.
(Continued)

Primary Examiner — John B Walsh

(57) ABSTRACT

A mail processing method and apparatus, a device, a medium, a computer program product, and a computer program provided in the present disclosure, where the method includes: receiving a to-be-sent mail; obtaining, if it is identified that the to-be-sent mail includes an instant messaging group identifier, a group mail address corresponding to the instant messaging group identifier; and taking the group mail address as a recipient address and performing a sending operation on the to-be-sent mail. In the present disclosure, in a case of receiving, by a mail server, a mail sent by a mail client, if it is identified that the recipient includes an instant messaging group name, the mail is sent to a group address corresponding to the group name, which improves functional integration of email and IM software, thereby providing richer collaborative office functions.

25 Claims, 5 Drawing Sheets

(51) Int. Cl.
*G06Q 10/107* (2023.01)
*H04W 4/08* (2009.01)

(56) References Cited

U.S. PATENT DOCUMENTS

| | | | | |
|---|---|---|---|---|
| 2012/0231770 A1* | 9/2012 | Clarke | .................... | H04W 4/12 |
| | | | | 455/414.1 |
| 2013/0212200 A1* | 8/2013 | Dennis | ................ | H04L 67/1095 |
| | | | | 709/206 |
| 2014/0365505 A1* | 12/2014 | Clark | .................... | G06Q 10/10 |
| | | | | 707/748 |
| 2016/0057095 A1 | 2/2016 | Fox et al. | | |
| 2016/0366077 A1* | 12/2016 | Dong | .................... | H04L 51/56 |
| 2018/0004965 A1 | 1/2018 | Gawali et al. | | |
| 2018/0004967 A1 | 1/2018 | Gawali et al. | | |

FOREIGN PATENT DOCUMENTS

| | | |
|---|---|---|
| CN | 102891791 A | 1/2013 |
| CN | 104935502 A | 9/2015 |
| CN | 105376145 A | 3/2016 |
| CN | 109921985 A | 6/2019 |
| CN | 110113249 A | 8/2019 |
| CN | 110460509 A | 11/2019 |
| CN | 110768804 A | 2/2020 |
| CN | 110928428 A | 3/2020 |
| CN | 111339776 A | 6/2020 |
| CN | 111798207 A | 10/2020 |
| WO | 2008091636 A1 | 7/2008 |
| WO | 2009086765 A1 | 7/2009 |
| WO | 2011029300 A1 | 3/2011 |

OTHER PUBLICATIONS

First Office Action dated Dec. 10, 2021 in Chinese Patent Application No. 202010600626.1 with English translation.
Extended EP Search Report dated Sep. 8, 2023 in EP Appl. No. 21833089.2 (9 pages).

* cited by examiner

MAIL PROCESSING METHOD AND APPARATUS, DEVICE AND MEDIUM

CROSS-REFERENCE TO RELATED APPLICATIONS

This application is a continuation of International Application No. PCT/CN2021/101337, filed on Jun. 21, 2021, which claims priority to Chinese patent application No. 202010600626.1, filed to China National Intellectual Property Administration on Jun. 28, 2020, and entitled "Mail Processing Method and Apparatus, Device and Medium". Both of the aforementioned applications are incorporated herein by reference in their entireties.

TECHNICAL FIELD

Embodiments of the present disclosure relate to computer data processing technology and, in particular, to a mail processing method and apparatus, a device, a medium, a computer program product, and a computer program.

BACKGROUND

Email and instant messaging (IM) software are commonly used collaboration software at present. With collaboration work becoming normality, the email and the IM software both assume a function of information interaction.

SUMMARY

Embodiments of the present disclosure provide a mail processing method and apparatus, a device, a medium, a computer program product, and a computer program, so as to improve functional integration of email and IM software, thereby providing richer collaborative office functions.

In a first aspect, an embodiment of the present disclosure provides a mail processing method, including:

receiving a to-be-sent mail;

obtaining, if it is identified that the to-be-sent mail includes an instant messaging group identifier, a group mail address corresponding to the instant messaging group identifier; and sending the to-be-sent mail to a recipient address indicated by a recipient identifier, where the recipient address includes the group mail address.

In a second aspect, an embodiment of the present disclosure further provides a mail processing method, including:

obtaining a recipient identifier, where the recipient identifier includes multiple instant messaging group identifiers, or the recipient identifier includes a personal mail address and at least one instant messaging group identifier; and sending, based on the recipient identifier, a mail to a recipient indicated by the recipient identifier.

In a third aspect, an embodiment of the present disclosure further provides a mail processing apparatus, including:

a receiving module, configured to receive a to-be-sent mail;

an address obtaining module, configured to obtain, if it is identified that the to-be-sent mail includes an instant messaging group identifier, a group mail address corresponding to the instant messaging group identifier; and a first sending module, configured to send the to-be-sent mail to a recipient address indicated by a recipient identifier, where the recipient address includes the group mail address.

In a fourth aspect, an embodiment of the present disclosure further provides a mail processing apparatus, including:

an identifier obtaining module, configured to obtain a recipient identifier; where the recipient identifier includes multiple instant messaging group identifiers, or the recipient identifier includes a personal mail address and at least one instant messaging group identifier; and a second sending module, configured to send, based on the recipient identifier, a mail to a recipient indicated by the recipient identifier.

In a fifth aspect, an embodiment of the present disclosure provides a device, including:

one or more processors;

a memory having stored thereon one or more programs; and the one or more programs, when executed by the one or more processors, cause the one or more processors to implement the mail processing method according to any one of the embodiments of the present disclosure.

In a sixth aspect, an embodiment of the present disclosure further provides a medium, where the medium stores a computer program which, when executed by a processor, implements the mail processing method according to any one of the embodiments of the present disclosure.

In a seventh aspect, an embodiment of the present disclosure further provides a computer program product having stored thereon a computer program which, when executed by a processor, implements the mail processing method according to any one of the embodiments of the present disclosure.

In an eighth aspect, an embodiment of the present disclosure further provides a computer program which, when executed by a processor, implements the mail processing method according to any one of the embodiments of the present disclosure.

The present disclosure provides the mail processing method and apparatus, the device, the medium, the computer program product, and the computer program, where the method includes: receiving a to-be-sent mail; obtaining, if it is identified that the to-be-sent mail includes an instant messaging group identifier, a group mail address corresponding to the instant messaging group identifier; and taking the group mail address as a recipient address and performing a sending operation on the to-be-sent mail. In the present disclosure, in the case of receiving a mail sent by a mail client, if it is identified that the recipient includes an instant messaging group name, the mail is sent to a group address corresponding to the group name, which improves functional integration of email and IM software, thereby providing richer collaborative office functions.

BRIEF DESCRIPTION OF THE DRAWINGS

With reference to accompanying drawings and following specific implementations, the above and other features, advantages, and aspects of the various embodiments of the present disclosure will become more apparent. The same or similar reference numbers throughout the accompanying drawings indicate the same or similar elements. It should be understood that the accompanying drawings are schematic and the components and elements are not necessarily drawn to scale.

DESCRIPTION OF EMBODIMENTS

Embodiments of the present disclosure will be described in more detail below with reference to the accompanying drawings. Although some embodiments of the present disclosure are shown in the accompanying drawings, it should be understood that the present disclosure can be implemented in various forms, and should not be construed as limited to the embodiments set forth herein. On the contrary, these embodiments are provided for a more thorough and complete understanding of the present disclosure. It should be understood that the accompanying drawings and embodiments of the present disclosure are for exemplary purposes only, and are not intended to limit the scope of protection of the present disclosure.

It should be understood that the steps described in the method embodiments of the present disclosure may be performed in a different order, and/or concurrently. Furthermore, method embodiments may include additional steps and/or may not perform the steps shown, and the scope of the present disclosure is not limited in this regard.

As used herein, the term "including" and variations thereof mean including without limitation, which is the same thing as "including, but not limited to". The term "based on" means "based at least in part on." The term "an embodiment" means "at least one embodiment"; the term "another embodiment" means "at least one additional embodiment"; and the term "some embodiments" means "at least some embodiments." Relevant definitions of other terms will be given below.

It should be noted that concepts such as "first" and "second" used in the present disclosure are only intended to distinguish different apparatuses, modules or units, and are not meant to limit order or interdependence of the functions performed by these apparatuses, modules or units.

It should be noted that "one" and "multiple" used in the present disclosure are illustrative rather than limiting, and those skilled in the art should understand that they should be understood as "one or more" unless otherwise clearly indicated in the context.

Names of messages or of information exchanged between multiple apparatuses in the embodiments of the present disclosure are for illustrative purposes only, and are not intended to limit the scope of these messages or information.

Embodiment I

Figure 1:
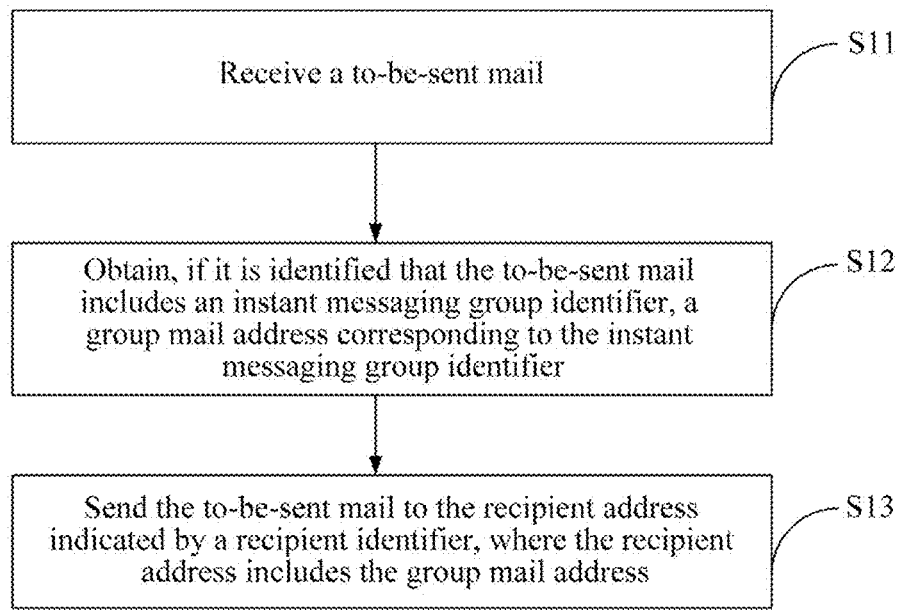
FIG. 1 is a flowchart of a mail processing method according to Embodiment I of the present disclosure.

FIG. 1 is a flowchart of a mail processing method according to Embodiment I of the present disclosure. This embodiment is applicable to a case of functional integration of email and IM software, the method may be performed by a mail processing apparatus, and the apparatus can be implemented by means of software and/or hardware. The mail processing apparatus can, for example, be integrated in the mail server.

As shown in FIG. 1, the mail processing method according to this embodiment mainly includes steps S11, S12 and S13.

S11, receive a to-be-sent mail.

In this embodiment, with the continuous development of the Internet, instant messaging applications have become most widely used communication methods, and are increasingly used in daily mobile office. Therefore, functional integration of the instant messaging application and email is conducive to the mobile development of enterprise work and management, and the user can seamlessly switch between the instant messaging and mail delivery. The to-be sent mail refers to an email that needs to be sent to the recipient, and for example, it may be sent by a mail client.

S12, obtain, if it is identified that the to-be-sent mail includes an instant messaging group identifier, a group mail address corresponding to the instant messaging group identifier.

Instant messaging is also known as real-time communication, which refers to services that can instantly send and receive Internet messages, etc. Instant messaging is generally implemented by instant messaging applications, which may be an enterprise instant messaging (Enterprise Instant Messaging, EIM), and may also be a personal instant messaging software, which is not limited in this embodiment.

The instant messaging group may refer to a messaging group that includes multiple group members in the instant messaging software. The instant messaging group identifier can be an identifier used to uniquely represent the group, for example, a group name that can be distinguished from other groups in the same IM application, or, a group ID (Identification), etc.

In this embodiment, the number of the above instant messaging group identifiers may be determined according to the input from the mail client. There may be one or multiple instant messaging group identifiers, and the multiple instant messaging group identifiers indicate that it is required to send the to-be-sent mail to the member mail addresses of members of multiple instant messaging group identifiers.

In some optional implementations, identifying that the to-be-sent mail includes an instant messaging group identifier includes: identifying, at a specified position of the to-be-sent mail, whether the instant messaging group identifier is added to the specified position; if the instant messaging group identifier is added to the specified position, it is determined that the to-be-sent mail includes the instant messaging group identifier. The above specified position can be in a packet header of the to-be-sent mail, and can also be any position such as a subject of the mail, a body of the mail, and a recipient of the mail. In this embodiment, the position of the instant messaging group identifier is only described, not limited.

In some optional implementations, identifying that the to-be-sent mail includes an instant messaging group identifier includes: after identifying a specified identifier, determining the group identifier following the specified identifier to be the messaging group identifier. The above specified identifier can be set as required, for example: in the case that the specified identifier is a first state, the group identifier following the specified identifier is determined as the messaging group identifier. Specifically, the specified identifier may be "1", or may be a preset specified character. In this embodiment, the specified identifier is only described, not limited.

In this embodiment, the instant messaging group identifier and the group mail address correspond to each other, that is, each instant messaging group corresponds to (only) one group mail address. For example, the group mail address corresponding to the instant messaging group whose group identifier is a "first project department" is diyixiangmubu@xx.com. A correspondence between the instant messaging group identifier and the group mail address may be created when the group mail is sent for the first time, or is created by a manager of the instant messaging group, or is generated when the group is established. Where it is created when the group mail is sent for the first time, which may be understood that the received mail includes the instant messaging group identifier, but there is no corresponding group mail address for the instant messaging group identifier, so the group mail address corresponding to the instant messaging group identifier is created. In this way, in the case that the instant messaging group identifier is detected and there is no corresponding group mail address, a group mail address is created, thereby avoiding waste of mail addresses caused by creating group mail addresses for each group identifier.

Further, the correspondence between the instant messaging group identifier and the group mail address can also be modified during subsequent use by the administrator of the group or the like.

When the above correspondence is created by a mail server, a group mail address of the same type as the mail address provided by the mail server can be created. The above type can be represented by a suffix name of the mail address. The same type refers to having the same suffix name of the mail address. For example, when the mail address is 12345@xx.com, a suffix is "xx.com".

In some optional implementations, the group mail address is a hash address which refers to an address directly obtained by a hash function according to a keyword. That is to say, the hash address can be quickly found through a mapping relationship between the keyword and the hash address. Specifically, the keyword may be determined based on the group identifier. In this way, the group mail address can be quickly queried by the group identifier, thereby improving search speed of the group mail address.

Obtaining the group mail address corresponding to the instant messaging group identifier may be the case that the mail server performs a query based on the instant messaging group identifier to obtain the queried group mail address. If the group mail address corresponding to the instant messaging group identifier is not found, it may indicate that no group mail address is created for the group. In this case, a corresponding group mail address may be created for the above instant messaging group identifier. In this way, creating a group mail address when it is necessary to distribute a mail to members of a group, is referred to as a creation as required, which can save resources (mail address resources, storage resources, etc.), and can also improve query efficiency at the same time.

Further, if it is identified that the to-be-sent mail does not include the instant messaging group identifier, the to-be-sent mail is just an ordinary mail and does not need to be sent in a group, and can be sent based on the recipient address of the to-be-sent mail.

S13, send the to-be-sent mail to the recipient address indicated by a recipient identifier, where the recipient address includes the group mail address.

In some optional implementations, the sending the to-be-sent mail to the recipient address indicated by the recipient identifier includes: in response to a case that a sender is a group member of the instant messaging group, blocking sending the to-be-sent mail to the sender. In this case, if the sender is also a member of the instant messaging group of the recipient and already knows content of the mail, additional interruptions to the sender can be avoided.

The mail processing method provided by the present disclosure includes: receiving a to-be-sent mail; obtaining, if it is identified that the to-be-sent mail includes an instant messaging group identifier, a group mail address corresponding to the instant messaging group identifier; and taking the group mail address as a recipient address and performing a sending operation on the to-be-sent mail. In the present disclosure, in the case of receiving a mail sent by a mail client, if it is identified that the recipient includes an instant messaging group name, the mail is sent to a group address corresponding to the group name, which improves functional integration of email and IM software, thereby providing richer collaborative office functions.

In some embodiments, the obtaining the group mail address corresponding to the instant messaging group identifier may include: querying whether the group mail address corresponding to the instant messaging group identifier exists; if the group mail address corresponding to the instant messaging group identifier does not exist, creating a corresponding group mail address for the instant messaging group.

In this embodiment, if it is identified that the to-be-sent mail includes the instant messaging group identifier, it is required to firstly query whether the group mail address corresponding to the instant messaging group identifier exists; if the group mail address corresponding to the instant messaging group identifier exists, the group mail address corresponding to the instant messaging group identifier is obtained directly; if the group mail address corresponding to the instant messaging group identifier does not exist, the corresponding group mail address for the instant messaging group identifier is created, and the correspondence between the instant messaging group identifier and the group mail address is stored. In this way, in the next time when mass mail of the group is performed, the group mail address corresponding to the instant messaging group identifier can be quickly queried, which avoids the problem that the group mail address is required to be created every time a group mail is sent, thereby reducing operating pressure of the mail server. And the group mail addresses for members of the group are only created when it is required to distribute mails for the members of the group is a creation as required, and can save resources (mail address resources, storage resources, etc.).

Embodiment II

Figure 2:
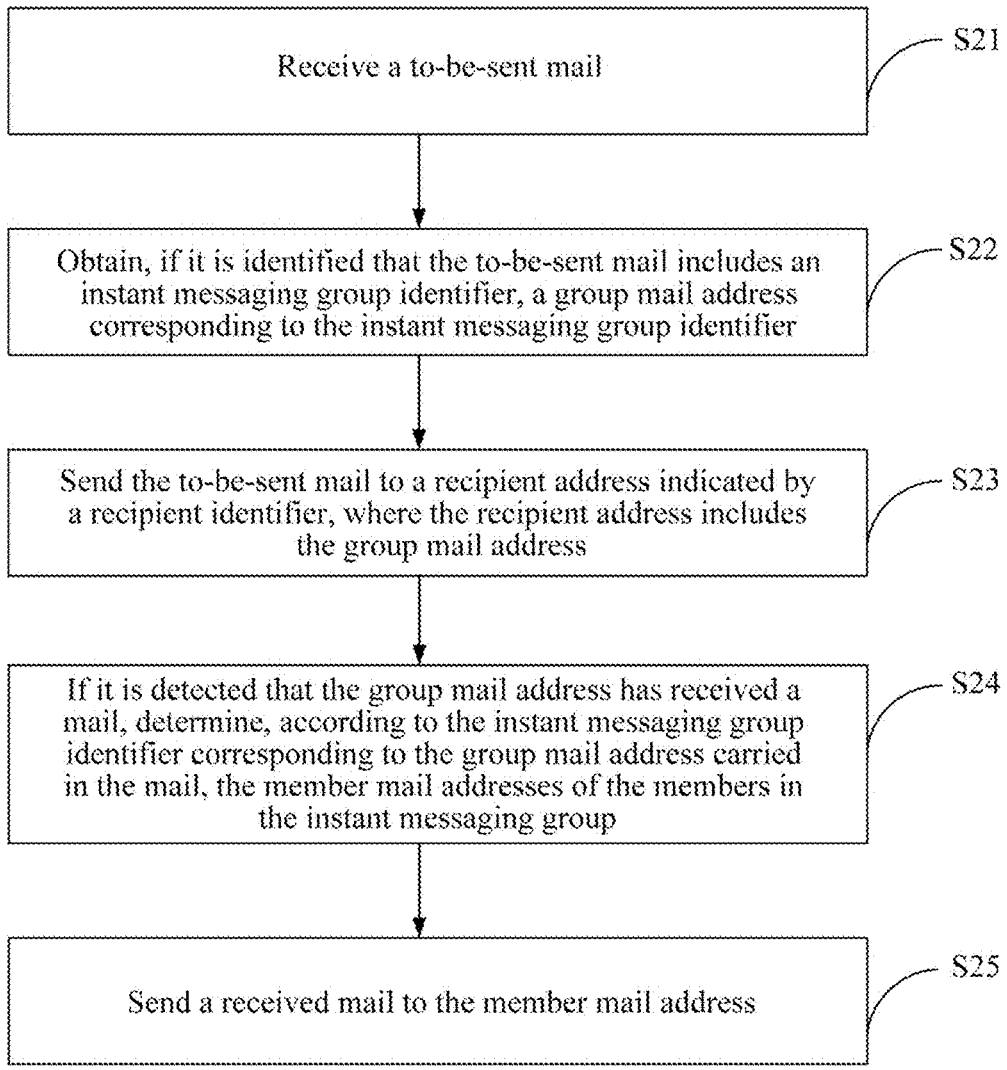
FIG. 2 is a flowchart of another mail processing method according to Embodiment II of the present disclosure.

FIG. 2 is a flowchart of another mail processing method according to Embodiment II of the present disclosure. As shown in FIG. 2, the mail processing method provided by this embodiment mainly includes steps S21, S22, S23, S24 and S25.

S21, receive a to-be-sent mail.

S22, obtain, if it is identified that the to-be-sent mail includes an instant messaging group identifier, a group mail address corresponding to the instant messaging group identifier.

S23, send the to-be-sent mail to a recipient address indicated by a recipient identifier, where the recipient address includes the group mail address.

S24, if it is detected that the group mail address has received a mail, determine, according to the instant messaging group identifier corresponding to the group mail address carried in the mail, the member mail addresses of the members in the instant messaging group.

In this embodiment, the member mail addresses refer to respective email address of each member in the instant messaging group. In this embodiment, there is no limitation on the types of member mail addresses, any legal mail address that is bound to the user by the user can be used as a member mail address. Where the mail address bound to the user by the user may be the mail address bound by the user himself, it may also be assigned by a group administrator, or it may be automatically generated by a system and then notified to the user.

The member mail address can be registered and created by the user on the mail server, and its type can be represented by the suffix of the mail address. The member mail address can also be the mail address that is received by the server and is bound to the member by the member himself. In this way, compatibility with various types of mail addresses can improve freedom of decision for the user and enable the user to get a better experience.

In an optional implementation, the member mail address bound to the group member is the mail address corresponding to the mail server associated with the IM group server, for example, a provider of the IM service is just the provider of the mail service, so that it may be ensured that all mails sent to the IM group can be automatically sent to the mailboxes corresponding to specific mail servers, thereby ensuring information security. For example, the mails are all sent to the company mailbox, not to the personal mailbox, where the member mail address can be automatically assigned by the IM server to the group member, or it may be an existing mail address of a group member whose type is consistent with the type of the mail server.

In an instance, determining the member mail addresses of the members in the instant messaging group may be: requesting, based on the instant messaging group identifier, member identifiers of all members in the group from the instant messaging server, and then determining the member mail address of each member based on the above member identifier. Therefore, the member identifiers in the group can be obtained in real time, and it is possible to ensure that the obtained group member information is up to date.

In another instance, determining the member mail addresses of the members in the instant messaging group may be: querying, by the mail server, the member mail address of each member in the instant messaging group that are stored locally in advance. Specifically, based on the instant messaging group identifier, member identifiers of all members in the group are requested from the instant messaging server at the mail server, and the member mail address of each member is determined based on the above member identifier, and then the mail addresses of all members of the group are saved in groups, so that the next time a group mail is sent, the member mail addresses of the group can be obtained directly.

Further, when the group members are updated, the instant messaging server synchronizes the member update with the mail server, so that the mail server can update the member mail addresses of the group according to the above member update situation.

S25, send a received mail to the member mail address.

In this embodiment, after determining the member mail address, the mails received at the group mail address are distributed to each member mail address, so that all members of the group can receive the mail.

In this regard, the distributing the mail received at the group mail address to each member mail address may be understood as "delivering" the mail from the group mail address to the group member mail address. In the distribution process, none of the information in the mail will be modified, that is, the sender of the mail is still an original sender's mail address, and the recipient of the mail is still the group mail address.

In this embodiment, by distributing mails to member mail addresses via a group mail address, information of the original sender can be preserved, so that after the group members receive the mail, they can clearly know the specific information of the sender, thereby preventing members from being unable to get the information of the sender of the mail.

On the basis of the above embodiments, the determining, according to the instant messaging group identifier corresponding to the group mail address carried in the mail, at least one member mail address corresponding to the instant messaging group includes: initiating, according to the instant messaging group identifier corresponding to the group mail address carried in the mail, a group member query request to an instant messaging server; receiving a member identifier included in the instant messaging group fed back by the instant messaging server; and determining, according to the member identifier, a member mail address of a member in the instant messaging group.

In this embodiment, after the mail server determines the instant messaging group identifier carried in the mail, it is necessary to initiate a group member query request to the instant messaging server, so as to determine specific members included in the group, that is, to whom the to-be-sent mail is required to be sent. After the instant messaging server receives the member query request sent by the mail server, the member identifiers of all members corresponding to the instant messaging group identifiers are obtained, and are then fed back to the mail server.

The mail server can determine the member mail address of each member according to the received member identifier, and then sends the mail to each member mail address. In this embodiment, a group member query request is initiated to the instant messaging server, and then the member mail address is determined according to the member identifier, so that every time a mail is sent, it can be sent to all members in the current group, thereby avoiding the problem of missing some members who join the group just now, or the problem of sending the mail to members who are no longer in the group, which improves accuracy of the mail recipient.

Embodiment III

Figure 3:
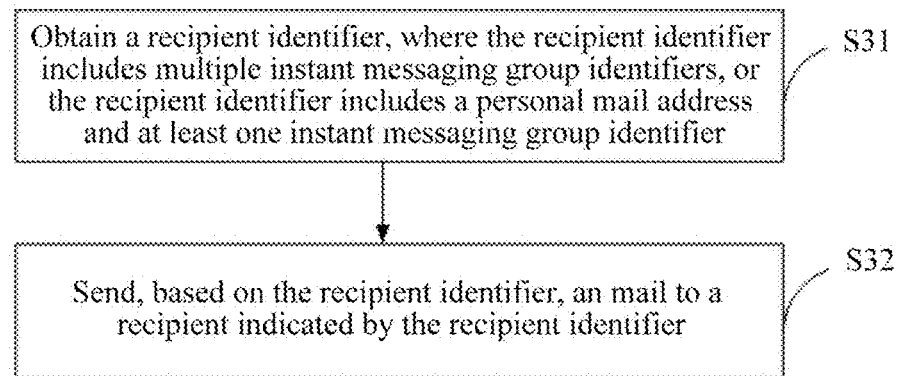
FIG. 3 is a flowchart of a mail processing method according to Embodiment III of the present disclosure.

FIG. 3 is a flowchart of a mail processing method according to Embodiment III of the present disclosure. This embodiment is applicable to the case of functional integration of email and IM software, the method may be performed by a mail processing apparatus, and the apparatus can be implemented by means of software and/or hardware. The mail processing apparatus can be integrated, for example, in a mail client.

As shown in FIG. 3, the mail processing method provided in this embodiment mainly includes steps S31 and S32.

S31, obtain a recipient identifier, where the recipient identifier includes multiple instant messaging group identifiers, or the recipient identifier includes a personal mail address and at least one instant messaging group identifier.

In this embodiment, the recipient identifier can be used to uniquely identify the recipient of a mail, the recipient identifier may be one or more messaging group identifiers, or the recipient identifier may be composed of one or more messaging group identifiers and a personal mail address.

In this embodiment, if there are multiple recipient identifiers, the mail servers to which the recipient identifiers belong are the same or are different. In this embodiment, if there are multiple personal mail addresses for the recipient identifier, there is no limitation on the type of personal mail address, any legal mail address that is bound to the user himself by the user can be used as a member mail address.

In an embodiment, receiving an input recipient identifier may be to receive a full instant messaging group identifier or a personal mail address input by the user in the recipient address box.

S32, send, based on the recipient identifier, a mail to a recipient indicated by the recipient identifier.

In this embodiment, the recipient identifier is carried in the mail; and the recipient identifier includes multiple instant messaging group identifiers, or the recipient identifier includes a personal mail address and at least one instant messaging group identifier.

In an optional implementation, the recipient identifier includes multiple instant messaging group identifiers, and the sending, based on the recipient identifier, the mail to the recipient indicated by the recipient identifier includes: sending the mail to the group mailbox indicated by the instant messaging group identifier, so as to distribute, by the group mailbox, mails to the member mail addresses of the instant messaging group.

In an optional implementation, the sending the mail to the recipient indicated by the recipient identifier includes: in response to a case that a sender is a group member of the instant messaging group, blocking sending the mail to the sender. In this case, if the sender is also a member of the instant messaging group of the recipient and already knows the content of the mail, additional interruptions to the sender can be avoided.

For the method for sending a mail to the recipient indicated by the recipient identifier, please refer to the mail processing methods described in Embodiment I and Embodiment II, which will not be repeated in this embodiment. For the method for sending a mail, at the mail server, based on personal mail addresses, please refer to an existing mail sending method, which will not be repeated in this embodiment.

The mail processing method provided by the present disclosure includes: obtaining the input recipient identifier, where the recipient identifier includes multiple instant messaging group identifiers, or the recipient identifier includes a personal mail address and at least one instant messaging group identifier; and sending the mail to the recipient through the mail server; receiving, by the mail receiver, the to-be-sent mail transmitted by the mail client; obtaining, if it is identified that the to-be-sent mail includes an instant messaging group identifier, a group mail address corresponding to the instant messaging group identifier; and taking the group mail address as a recipient address and performing a sending operation on the to-be-sent mail. In the present disclosure, in the case of receiving a mail sent by a mail client, if it is identified that the recipient includes an instant messaging group name, the mail is sent to a group address corresponding to the group name, which improves functional integration of email and IM software, thereby providing richer collaborative office functions.

In an implementation, the sending, based on the recipient identifier, the mail to the recipient indicated by the recipient identifier includes: sending, based on the recipient identifier, the mail to the group member indicated by the group identifier in the multiple instant messaging group identifiers, or sending, based on the recipient identifier, the mail to the group member indicated by the at least one instant messaging group identifier and to the personal mail address; and sending, based on the recipient identifier, the mail to the group members respectively indicated by the multiple instant messaging group identifiers.

In an optional implementation, the sending, based on the recipient identifier, the mail to the group members indicated respectively by the multiple instant messaging group identifiers may be understood as performing concurrently mail sending for more than two single IM groups.

In an optional implementation, the mails are sent, based on the recipient identifier, to the group member indicated by the instant messaging group identifier and the recipient indicated by the personal mail address. In this embodiment, the mail sending process of the IM group is carried out at the same time as the sending process of the personal mail address, that is to say, there are two program branches are executed in background, which makes it convenient for the user to send mails to different types of recipients at one time, thereby reducing operating costs.

In an implementation, the sending the mail to the group mailbox indicated by the instant messaging group identifier, to enable the group mailbox to distribute the mail to the member mail address of the instant messaging group includes: sending the mail to the mail server, so that the mail server determines a group mail address according to the instant messaging group identifier, sends the mail to the group mail address, and distributes the mail to the member mail address of the instant messaging group.

Embodiment IV

Figure 4:
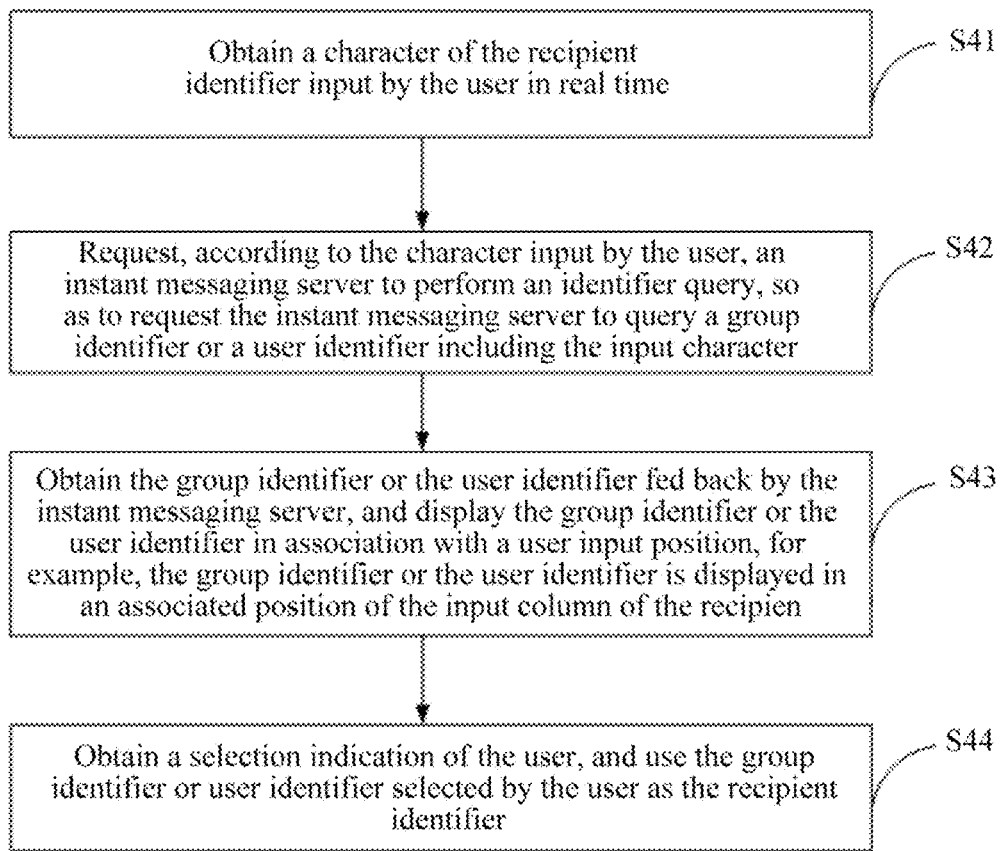
FIG. 4 is a flowchart of another mail processing method according to Embodiment IV of the present disclosure.

FIG. 4 is a flowchart of another mail processing method according to Embodiment IV of the present disclosure. As shown in FIG. 4, an optimized mail processing method provided in this embodiment mainly includes steps S41, S42, S43, and S44.

S41, obtain a character of the recipient identifier input by the user in real time.

The character of the recipient identifier may refer to any character in the recipient identifier, for example, it can be any character in a personal mail address, and it can also be any character in the instant messaging group identifier, which is not limited in this embodiment.

Further, the character of the recipient identifier input in the recipient box by the user through the input apparatus of the mail client is obtained.

S42, request, according to the character input by the user, an instant messaging server to perform an identifier query, so as to request the instant messaging server to query a group identifier or a user identifier including the input character.

In this embodiment, based on the character input by the user, a real-time request is made to the instant messaging server, to query all group identifiers or user identifiers that include the character. The instant messaging server feeds back a queried group identifier or a queried user identifier to the mail client.

S43, obtain the group identifier or the user identifier fed back by the instant messaging server, and display the group identifier or the user identifier in association with a user input position, for example, the group identifier or the user identifier is displayed in an associated position of the input column of the recipient.

The mail client is based on the group identifier or the user identifier fed back by the instant messaging server, and displays it in association with the user input position for the user to select.

S44, obtain a selection indication of the user, and use the group identifier or user identifier selected by the user as the recipient identifier.

The selection indication of the user may refer to the group identifier or the user identifier displayed after being clicked by the user. Obtaining the selection indication of the user may refer to: obtaining a group identifier or a user identifier clicked by the user and taking the group identifier or the user identifier clicked by the user as the recipient identifier.

If the selection indication of the user is not obtained, the character of the recipient identifier subsequently input by the user is obtained and then combined with the character of the recipient identifier that was input before, and then an operation of requesting the instant messaging server to perform identifier query is performed.

In this embodiment, if the selection indication of the user is not obtained, it indicates that the group identifier or the user identifier fed back the instant messaging server does not contains the recipient that the user wants to send the mail to, thus it is required to continue to obtain the character of the identifier subsequently input by the user and combine the above character with the character of the recipient identifier that was input before, and then return back to perform the operation of requesting the instant messaging server to perform identifier query.

If it is detected that no character is input by the user for a preset period of time, and the instant messaging server also fails to feed back the group identifier or the user identifier according to the character input, the user will be reminded that the group identifier or the user identifier is not identified and whether the input character is continued to be used as the recipient identifier. If it is detected that the user determines to continue to use the input character as the recipient identifier, an operation of mail sending is performed.

In this embodiment, the user inputs the character of the group name into the recipient column using an association input method; a query request can be sent to the IM server in real time according to some characters input by the user, to query a group name or personal name that meets some characters, and such group name or personal name can be fed back to the mail client for display, for the user to select and input. Further, the automatic recommendation component may be invoked in response to the case of inputting a specific prompt by the user, and the candidate group identifier is automatically recommended, by the automatic recommendation component, based on what is input by the user, for the user to select and input. This can help the user to input the recipient identifier quickly and accurately, reduce the time for the user to input the complete recipient identifier, and improve the input speed.

Based on the above embodiment, the method further includes: obtaining a group mail address corresponding to the instant messaging group identifier, and displaying the group mail address in the mail.

In this embodiment, the mail server is requested to obtain the group mail address corresponding to the instant messaging group identifier; after obtaining the group mail address that corresponds to the instant messaging group identifier and is sent by the mail server, the group mail address is displayed in the mail. In this way, the user can clearly see the group mail address corresponding to the group, so that the user can check whether the group mail address is correct, which avoids the problem of wrong mail sending caused by the wrong group mail address, thereby improving using experience of the user.

Embodiment V

On the basis of the above embodiment, another mail processing method is provided. The mail processing method provided by this embodiment performs a deduplication operation on duplicate recipient addresses. The deduplication operation can be performed by the mail server or by the mail client.

In this embodiment, the sending, based on the recipient identifier, the mail to the recipient address indicated by the recipient identifier includes: performing a deduplication operation on the recipient address indicated by the recipient identifier, and sending the mail to a deduplicated recipient address.

The deduplication operation refers to the case where there are multiple identical recipient addresses, and mail is sent to only one of the recipient addresses.

In this embodiment, if the recipient identifier includes multiple instant massaging group identifiers, the same group members may exist in the multiple instant massaging groups, that is, one group member may be in multiple instant massaging groups at the same time.

When a group member exists in multiple instant messaging groups, in order to prevent each group mail from distributing mails to its corresponding member mail addresses, a deduplication operation is required. That is, when a group member exists in multiple instant messaging groups, there is only one group mail address that distributes the mail to the group member.

Further, the group mail address for distributing mails can be set as required. For example, the group mail address for distributing mails may correspond to a group mail address with fewer members in the group. For another example, the group mail address for distributing mails may also correspond to the top group identifiers in the recipient identifier.

In an optional implementation, the performing the deduplication operation on the recipient address indicated by the recipient identifier includes: determining, according to the instant messaging group identifier, a member included in the instant messaging group; and determining, based on the member identifier of the member, a member mail address; and performing the deduplication operation on the member mail address to obtain a deduplicated member mail address.

In this embodiment, performing the deduplication operation based on the determined member mail addresses refers to: since the determined member mail addresses are duplicated, only one of them is selected to send a mail.

In an optional implementation, the performing the deduplication operation on the recipient address indicated by the recipient identifier includes: determining a member included in the instant messaging group according to the instant messaging group identifier; performing the deduplication operation based on the member identifier of the member; and determining a member mail address based on a deduplicated member identifier.

In this embodiment, the deduplication operation is performed based on the member identifier fed back by the IM server. If there are duplicate member identifiers in the feedback, only one member identifier is reserved.

The member mail address is determined according to the deduplicated member identifier, which can avoid repeated determination of the member mail address with the same member identifier. In this way, the time for determining the member mail and the waste of resources can be reduced.

Embodiment VI

Figure 5:
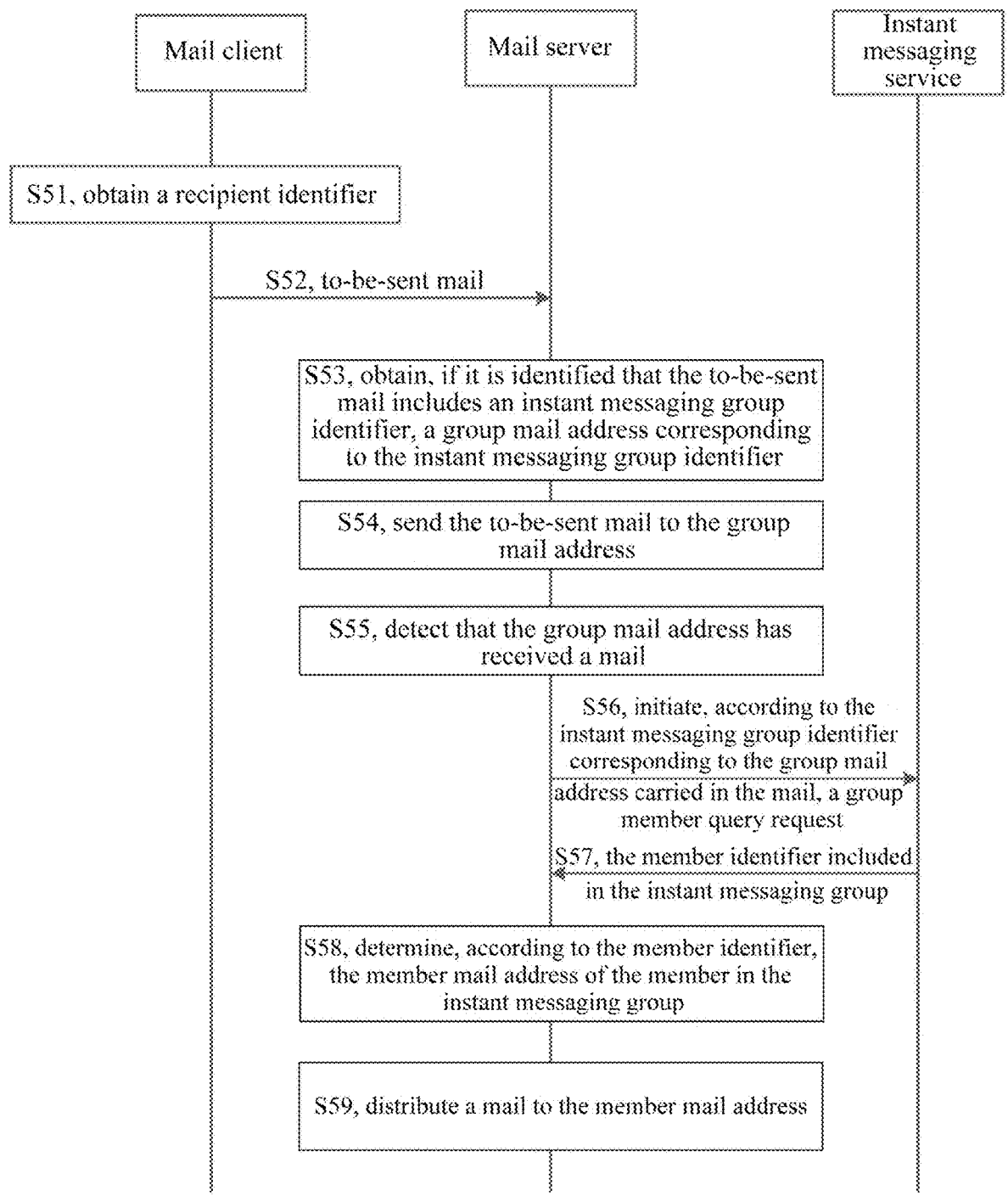
FIG. 5 is an interactive flowchart of a mail processing method according to Embodiment VI of the present disclosure.

On the basis of the above embodiments, an interactive process of a mail processing method is provided. FIG. 5 is an interactive flowchart of a mail processing method according to Embodiment VI of the present disclosure. As shown in FIG. 5, S51, a mail client obtains a recipient identifier, where the recipient identifier includes multiple instant messaging group identifiers, or the recipient identifier includes a personal mail address and at least one instant messaging group identifier.

The instant messaging group identifier may be obtained through feedback by the IM server after the request by the mail client and the IM server.

S52, the mail client sends a to-be-sent mail to a mail server.

S53, the mail server obtains, if it is identified that the to-be-sent mail includes an instant messaging group identifier, a group mail address corresponding to the instant messaging group identifier.

S54, the mail server sends the to-be-sent mail to the group mail address.

S55, the mail server detects that the group mail address has received a mail.

S56, the mail server initiates, according to the instant messaging group identifier corresponding to the group mail address carried in the mail, a group member query request to the instant messaging server.

S57, the mail server receives the member identifier included in the instant messaging group fed back by the instant messaging server.

S58, the mail server determines, according to the member identifier, the member mail address of the member in the instant messaging group.

S59, the mail server distributes a mail to the member mail address.

The mail processing method provided by the present disclosure, including: receiving, by the mail server, the to-be-sent mail sent by the mail client; obtaining, if it is identified that the to-be-sent mail includes an instant messaging group identifier, a group mail address corresponding to the instant messaging group identifier; and taking the group mail address as a recipient address and performing a sending operation on the to-be-sent mail. In the present disclosure, in the case of receiving a mail sent by a mail client, if it is identified that the recipient includes an instant messaging group name, the mail is sent to a group address corresponding to the group name, which improves functional integration of email and IM software, thereby providing richer collaborative office functions.

For any of the above embodiments, in some optional implementations, if the instant messaging group identifier is included in body of the mail, the group mail address indicated by the instant messaging group identifier is added to the recipient address. In the embodiments of the present application, the position of the instant messaging group identifier is only described, but not limited.

For any of the above embodiments, in some optional implementations, during a user input process, a candidate instant messaging group identifier may be automatically recommended according to what is input by the user. Further, an automatic recommendation component can be invoked in response to a specific prompt input by the user. Further, the automatic recommendation component may be invoked in response to the case of inputting a specific prompt by the user, and the candidate group identifier is automatically recommended, by the automatic recommendation component, based on what is input by the user, for the user to select and input.

For any of the above embodiments, in some optional implementations, the candidate instant messaging group identifier has display information representing the instant messaging group. The display information representing the instant messaging group can further distinguish the instant messaging group from other recipients (such as a single recipient and a mail group). Specifically, in some application scenarios, if an identity of a recipient user (such as a name) is input in the recipient (such as a subject of the mail, a body of the mail, a recipient of the mail, etc.), the mail address of the recipient user and the instant messaging group including the recipient user may be presented via the recommendation component. At this point, because of the display information representing the instant messaging group, individual can be distinguished from the group.

For any of the above embodiments, the instant messaging group identifier may be associated with the sender. The association can be interpreted as having certain operation rights for corresponding groups (including but not limited to a group member, a group owner, a group administrator, etc.).

For any of the above embodiments, in some optional implementations, the group mail address can be a hash (randomly generated) address, a keyword corresponding to the group identifier, or a combination of the two.

For any of the above embodiments, in some optional implementations, the group mail address may correspond to the instant messaging group identifier one-to-one, and it may also be a set of mail addresses of group members obtained based on the instant messaging group identifier. If the group mail address corresponds to the instant messaging group identifier one-to-one, the personal mail addresses of other group members in the group that is not exposed to the recipient can be obtained, which is beneficial to achieve the technical effect of privacy protection.

For any of the above embodiments, in some optional implementations, the recipient identifier includes multiple instant messaging group identifiers, and the sending, based on the recipient identifier, a mail to the recipient indicated by the recipient identifier includes: querying, based on the instant messaging group identifier, a group member identifier; determining, according to the group member identifier obtained based on query, a group member mail address; and sending the mail to the group member mail address.

For any of the above embodiments, receiving a to-be-sent mail may refer to: the mail client receives, during a process of editing the mail by the user, edited contents, or the mail client receives mails sent by others.

For any of the above embodiments, identification time for the "it is identified that the to-be-sent mail includes an instant messaging group identifier" is not limited, and the identification may be performed following the receiving process, after editing, or in response to a triggering operation. If it is a scenario of receiving mails sent by others, whether it includes a group identifier can be determined by identifying a preset position (body, title, etc.) of the mail.

Embodiment VII

Figure 6:
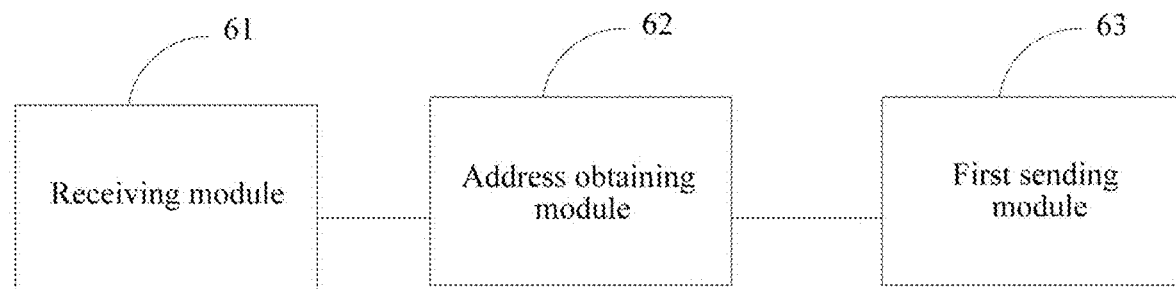
FIG. 6 is a structural diagram of a mail processing apparatus according to Embodiment VII of the present disclosure.

FIG. 6 is a structural diagram of a mail processing apparatus according to Embodiment VII of the present disclosure. This embodiment may be applicable to a case of functional integration of email and IM software, and the apparatus can be implemented by means of software and/or hardware. The mail processing apparatus can, for example, be integrated in the mail server.

As shown in FIG. 6, the mail processing apparatus provided in this embodiment mainly includes a receiving module 61, an address obtaining module 62 and a first sending module 63.

The receiving module 61 is configured to receive a to-be-sent mail;

the address obtaining module 62 is configured to obtain, if it is identified that the to-be-sent mail includes an instant messaging group identifier, a group mail address corresponding to the instant messaging group identifier; and the first sending module 63 is configured to send the to-be-sent mail to a recipient address indicated by a recipient identifier, where the recipient address includes the group mail address.

The mail processing apparatus provided by the present disclosure includes: the mail server receives the to-be-sent mail by the mail client; obtains, if it is identified that the to-be-sent mail includes an instant messaging group identifier, a group mail address corresponding to the instant messaging group identifier; sends the to-be-sent mail to the recipient address indicated by the recipient identifier, where the recipient address includes the group mail address. In the present disclosure, in the case of receiving a mail sent by a mail client, if it is identified that the recipient includes an instant messaging group name, the mail is sent to a group address corresponding to the group name, which improves functional integration of email and IM software, thereby providing richer collaborative office functions.

In an embodiment, the apparatus further includes: a member mail determining module and a mail distribution module;

where the member mail determining module is configured to determine, according to the instant messaging group identifier corresponding to the group mail address carried in the mail, the member mail addresses of the members in the instant messaging group, if it is detected that the group mail address has received a mail;

the mail distribution module is configured to distribute received mails to the member mail addresses.

In an embodiment, the apparatus further includes: an address replacing module, configured to: before the distribution operation is performed by using the member mail address as the recipient address and using the received mail as the mail to be distributed, replace a mail address of a distributor of the mail to be distributed with the mail address of the sender of the to-be-sent mail.

In an embodiment, the member mail determining module includes:

a query request unit, configured to initiate, according to the instant messaging group identifier corresponding to the group mail address carried in the mail, a group member query request to an instant messaging server;

a member identifier receiving unit, configured to receive a member identifier included in the instant messaging group fed back by the instant messaging server; and a member mail address determining unit, configured to determine, according to the member identifier, a member mail address of a member in the instant messaging group.

In an embodiment, the address obtaining module 62 includes:

a group mail address query unit, configured to query whether the group mail address corresponding to the instant messaging group identifier exists; and a group mail address creation unit, configured to create a corresponding group mail address for the instant messaging group, if the group mail address corresponding to the instant messaging group identifier does not exist.

In an embodiment, the apparatus further includes a deduplication module, which is configured to perform a deduplication operation on the recipient address indicated by the recipient identifier, and send the mail to a deduplicated recipient address.

In an optional implementation, the deduplication module is further configured to: determine a member included in the instant messaging group according to the instant messaging group identifier; perform the deduplication operation based on a member identifier of the member; and determine a member mail address according to a deduplicated member identifier (ID).

In an optional implementation, the deduplication module is further configured to: determine, according to the instant messaging group identifier, a member included in the instant messaging group; determine, based on the member identifier of the member, a member mail address; and perform the deduplication operation on the member mail address to obtain a deduplicated member mail address.

Embodiment VIII

Figure 7:
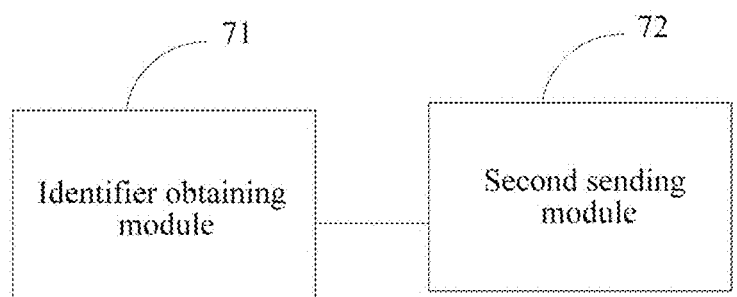
FIG. 7 is a structural diagram of a mail processing apparatus according to Embodiment VIII of the present disclosure.

FIG. 7 is a structural diagram of a mail processing apparatus according to Embodiment VIII of the present disclosure. This embodiment is applicable to a case of functional integration of email and IM software. The apparatus can be implemented by means of software and/or hardware. The mail processing apparatus can, for example, be integrated in the mail client.

As shown in FIG. 7, the mail processing apparatus provided in this embodiment mainly includes an identifier obtaining module 71 and a second sending module 72.

The identifier obtaining module 71 is configured to obtain a recipient identifier, where the recipient identifier includes multiple instant messaging group identifiers, or the recipient identifier includes a personal mail address and at least one instant messaging group identifier; and the second sending module 72 is configured to send, based on the recipient identifier, a mail to a recipient indicated by the recipient identifier.

In an embodiment, the second sending module 72 is specifically configured to send, based on the recipient identifier, the mail to the group member indicated by the group identifier in the multiple instant messaging group identifiers, or send, based on the recipient identifier, the mail to the group member indicated by the at least one instant messaging group identifier and to the personal mail address.

In an embodiment, the identifier obtaining module 71 includes:

a character obtaining unit, configured to obtain a character of the recipient identifier input by the user in real time;

a request query unit, configured to request, according to the character input by the user, an instant messaging server to perform an identifier query, so as to request the instant messaging server to query a group identifier or a user identifier including the input character; and an identifier obtaining unit, configured to obtain the group identifier or the user identifier fed back by the instant messaging server, and display the group identifier or the user identifier at a position in association with the user input position (such as the input column of the recipient).

In an embodiment, the identifier obtaining module 71 further includes:

a recipient identifier determining unit, configured to use, if a selection indication of the user is obtained, the group identifier or user identifier selected by the user as the recipient identifier; and a character acquisition unit, configured to obtain, if the selection indication of the user is not obtained, the character of the recipient identifier subsequently input by the user, combine an obtained character with the character of the recipient identifier that was input before, and then return back to perform an operation of requesting the instant messaging server to perform the identifier query.

In an embodiment, if there are multiple recipient identifiers, the mail servers to which the recipient identifiers belong are the same or different.

In an embodiment, if the recipient identifier includes an instant messaging group identifier, the second sending module is specifically configured to send the mail to a group mailbox indicated by the instant messaging group identifier, to enable the group mailbox to distribute the mail to a member mail address of the instant messaging group.

In an embodiment, the second sending module is further configured to: send the mail to a mail server, to enable the mail server to determine a group mail address according to the instant messaging group identifier; send the mail to the group mail address, and distribute the mail to member mail address of the instant messaging group.

In an embodiment, the apparatus further includes: a group mail address display module, configured to obtain a group mail address corresponding to the instant messaging group identifier, and display the group mail address in the mail.

In an embodiment, the apparatus further includes: a deduplication module, configured to perform a deduplication operation on the recipient address indicated by the recipient identifier, and send the mail to a deduplicated recipient address.

In an optional implementation, the deduplication module is further configured to: determine a member included in the instant messaging group according to the instant messaging group identifier; perform the deduplication operation based on a member identifier of the member; and determine a member mail address based on a deduplicated member identifier (ID).

In an optional implementation, the deduplication module is further configured to: determine, according to the instant messaging group identifier, a member included in the instant messaging group; determine, based on the member identifier of the member, a member mail address; and perform the deduplication operation on the member mail address to obtain a deduplicated member mail address.

Embodiment IX

Figure 8:
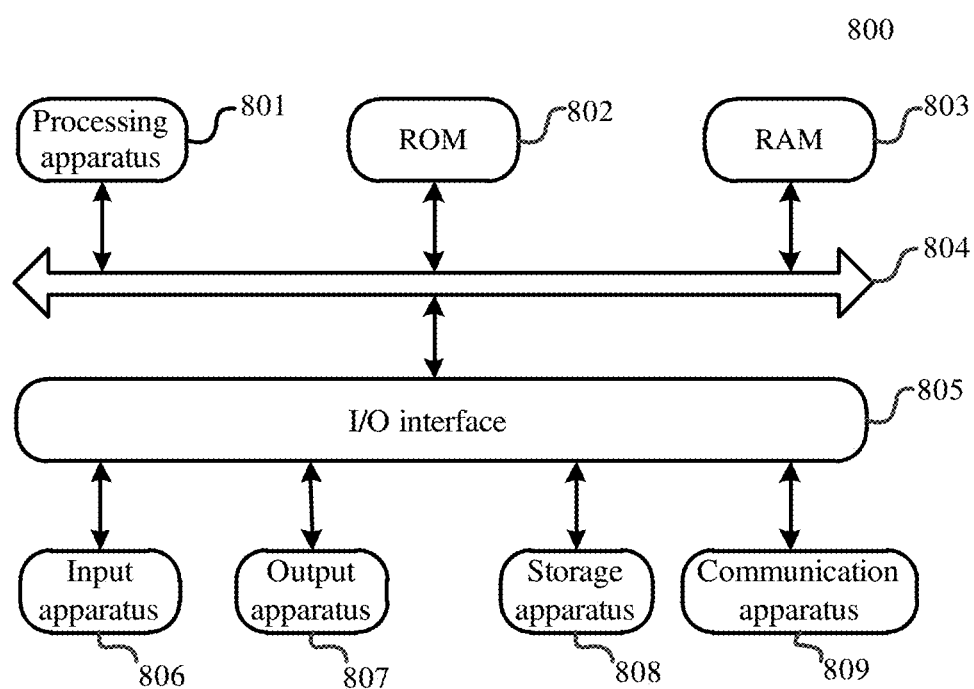
FIG. 8 is a structural diagram of an electronic device according to Embodiment IX of the present disclosure.

Please refer to FIG. 8, which shows a schematic structural diagram of an electronic device 800, for example, a terminal device or a server in FIG. 1, suitable for implementing an embodiment of the present disclosure. The terminal device in this embodiment of the present disclosure may include, but is not limited to, a mobile terminal such as a mobile phone, a notebook computer, a digital broadcast receiver, a PDA (Personal Digital Assistant), a PAD (Portable Android Device), a PMP (Portable Multimedia Player), and an in-vehicle terminal, for example, an in-vehicle navigation terminal, etc., and a fixed terminal such as a digital TV (Digital Television), a desktop computer, and the like. The electronic device shown in FIG. 8 is only an example, and should not impose any limitation on the function and application scope of the embodiments of the present disclosure.

As shown in FIG. 8, the electronic device 800 may include a processing apparatus 801, for example, a central processing unit, a graphics processing unit, etc., it can perform, according to a program stored in a read-only memory (ROM) 802 or a program loaded from a storage apparatus 808 into a random access memory (RAM) 803, various appropriate actions and processes. There are also various programs and data necessary for the operation of the electronic device 800 stored in the RAM 803. The processing apparatus 801, the ROM 802, and the RAM 803 are connected to each other through a bus 804. An input/output I/O) interface 805 is also connected to the bus 804.

In general, the following apparatuses may be connected to the I/O interface 805: an input apparatus 806, such as a touch screen, a touch pad, a keyboard, a mouse, a camera, a microphone, an accelerometer, a gyroscope, etc.; an output apparatus 807 such as a liquid crystal display (LCD), a speaker, a vibrator, etc.; a storage apparatus 808, such as a magnetic tape, a hard disk, etc.; and a communication apparatus 809. The communication apparatus 809 may allow electronic device 800 to communicate wirelessly or by wire with other devices to exchange data. Although FIG. 8 shows an electronic device 800 having various means, it should be understood that not all of the illustrated apparatuses are required to be implemented or provided. More or fewer apparatuses may alternatively be implemented or provided.

In particular, according to the embodiments of the present disclosure, the processes described above with reference to the flowcharts may be implemented as a computer software program. For example, the embodiment of the present disclosure include a computer program product including a computer program carried on a non-transitory computer readable medium, where the computer program contains program code for performing the method illustrated in the flowchart. In such an embodiment, the computer program can be downloaded and installed from the network through the communication apparatus 809, or the computer program can be installed from the storage apparatus 808, or the computer program can be installed from the ROM 802. When the computer program is executed by the processing apparatus 801, the above functions defined in the methods of the embodiments of the present disclosure are performed.

It should be noted that the computer-readable medium above in the present disclosure may be a computer-readable signal medium or a computer-readable storage medium, or a combination of the above two. The computer-readable storage medium can be, but not limited to, an electrical, a magnetic, an optical, an electromagnetic, an infrared, or a semiconductor system, an apparatus, or a component, or any combination of the above. A more specific example of the computer-readable storage medium may include, but not limited to: an electronic connection with one or more cables, a portable computer magnetic disk, a hard disk, a random access memory (RAM), a read only memory (ROM), an erasable programmable read only memory (EPROM or a flash memory), an optical fiber, a portable compact disk-read only memory (Compact Disk ROM, CD-ROM), an optical storage component, a magnetic storage component, or any suitable combination of the above. In the present disclosure, the computer-readable storage medium can be any tangible mediums including or storing a program, where the program can be used by an instruction-executing system, an apparatus or a component, or be used in combination with them. In the present disclosure, the computer-readable signal medium can include a data signal propagating in a baseband or as a part of a carrier wave, which carries a computer-readable program code. The data signal can be propagated by adopting various forms, which includes, but not limited to, an electromagnetic signal, an optical signal, or any suitable combination of the above. The computer-readable signal medium can also be any computer-readable medium other than the computer-readable storage medium, where the computer-readable signal medium can send, propagate or transmit a program used by or in combination with an instruction-executing system, an apparatus or a component. The program code included on the computer-readable medium can be transmitted by any suitable medium, which includes, but not limited to: a cable, an optical cable, RF (radio frequency), etc., or any suitable combination of the above.

In some implementations, the client and the server can communicate by using any currently known or future developed network protocols such as the HTTP (HyperText Transfer Protocol), and can be interconnected with digital data communication of any form or of any medium, for example, communication network. Examples of communication networks include the local area network (LAN), wide area network (WAN), Internet such as internetwork and end-to-end network, for example, Adaptive Heuristic for Opponent Classification, ad hoc end-to-end network, as well as any currently known or future developed network.

The above computer-readable medium may be contained in the above electronic device; and it may also exist alone without being assembled into the electronic device.

The above computer-readable medium carries one or more programs which, when executed by the electronic device, cause the electronic device to: receive a to-be-sent mail; obtain, if it is identified that the to-be-sent mail includes an instant messaging group identifier, a group mail address corresponding to the instant messaging group identifier; and send the to-be-sent mail to a recipient address indicated by a recipient identifier, where the recipient address includes the group mail address.

Alternatively, the above computer-readable medium carries one or more programs which, when executed by an electronic device, cause the electronic device to: obtain a recipient identifier, where the recipient identifier includes multiple instant messaging group identifiers, or the recipient identifier includes a personal mail address and at least one instant messaging group identifier; and send, based on the recipient identifier, a mail to a recipient indicated by the recipient identifier.

The computer program code for executing the operation of the present disclosure can be written in one or more programming languages or the combination thereof, and the above programming languages include, but not limited to, object-oriented programming languages such as Java, Smalltalk, C++, and also include conventional procedural programming languages such as "C" language, or similar programming languages. The program code can be completely executed on a user computer, partially executed on a user computer, executed as an independent software package, partially executed on a user computer and partially executed on a remote computer, or completely executed on a remote computer or a server. In cases involving remote computers, the remote computers can be connected to user computers through any kind of networks, which includes a local area network (LAN) or a wide area network (WAN), or can be connected to external computers, for example, using Internet service providers to connect through the Internet.

The flowcharts and block diagrams in the drawings illustrate the architecture, functions and operations of possible implementations of systems, methods and computer program products according to various embodiments of the present disclosure. In this regard, each block in the flowchart or block diagram may represent a module, a program segment, or a part of code containing one or more executable instructions for implementing specified logical functions. It should also be noted that in some alternative implementations, the functions noted in the blocks may also occur in an order different from those noted in the drawings. For example, two blocks represented in succession may actually be executed substantially in parallel, and they may sometimes be executed in a reverse order, depending on the functions involved. It should also be noted that each block in the block diagrams and/or flowcharts, and combinations of blocks in the block diagrams and/or flowcharts, can be implemented by a dedicated hardware-based system that performs specified functions or operations, or can be implemented by a combination of dedicated hardware and computer instructions.

The units involved in the embodiments of the present disclosure can be implemented by software or hardware. Where the name of the unit does not define the unit itself in some cases. For example, the receiving module can also be described as "a unit that receives the to-be-sent mail".

The above functions described herein may be performed at least in part by one or more hardware logic components. For example, without limitation, exemplary types of hardware logic components that can be used include a field programmable gate array (FPGA), an application specific integrated circuit (ASIC), an application specific standard product (ASSP), a system-on-chip (SOC), a complex programmable logic device (CPLD), etc.

In the context of the present disclosure, a machine-readable medium may be a tangible medium that may include or store a program used by or in connection with an instruction execution system, an apparatus or a device. The machine-readable medium may be a machine-readable signal medium or a machine-readable storage medium. The machine-readable medium may include, but not limited to, electronic, magnetic, optical, electromagnetic, infrared, or semiconductor systems, apparatuses, or devices, or any suitable combination of the above. More specific examples of the machine-readable storage medium include one or more wire-based electrical connections, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination of the above.

According to one or more embodiments of the present disclosure, there is provided a mail processing method, apparatus, and system, and the method includes:
  receiving a to-be-sent mail;
  obtaining, if it is identified that the to-be-sent mail includes an instant messaging group identifier, a group mail address corresponding to the instant messaging group identifier; and
  sending the to-be-sent mail to a recipient address indicated by a recipient identifier, where the recipient address includes the group mail address.

According to one or more embodiments of the present disclosure, there is provided a mail processing method, apparatus, and system, and the method includes:
  determining, according to the instant messaging group identifier corresponding to the group mail address carried in a mail, a member mail address of a member in the instant messaging group, if it is detected that the group mail address receives the mail; and sending a received mail to the member mail address.

According to one or more embodiments of the present disclosure, there is provided a mail processing method, apparatus, and system, and the method includes:

initiating, according to the instant messaging group identifier corresponding to the group mail address carried in the mail, a group member query request to an instant messaging server;

receiving a member identifier included in the instant messaging group fed back by the instant messaging server; and determining, according to the member identifier, a member mail address of a member in the instant messaging group.

According to one or more embodiments of the present disclosure, there is provided a mail processing method, apparatus, and system. In the above method, the sending the to-be-sent mail to the recipient address indicated by the recipient identifier includes: performing a deduplication operation on the recipient address indicated by the recipient identifier, and sending the mail to a deduplicated recipient address.

According to one or more embodiments of the present disclosure, there is provided a mail processing method, apparatus, and system. In the above method, the performing the deduplication operation on the recipient address indicated by the recipient identifier includes:

determining, according to the instant messaging group identifier, a member included in the instant messaging group;

performing the deduplication operation based on a member identifier of the member; and determining a member mail address based on a deduplicated member identifier (ID).

According to one or more embodiments of the present disclosure, there is provided a mail processing method, apparatus, and system. In the above method, the performing the deduplication operation on the recipient address indicated by the recipient identifier includes:

determining, according to the instant messaging group identifier, a member included in the instant messaging group;

determining, based on the member identifier of the member, a member mail address; and performing the deduplication operation on the member mail address to obtain a deduplicated member mail address.

According to one or more embodiments of the present disclosure, there is provided a mail processing method, apparatus, and system. In the above method, the obtaining the group mail address corresponding to the instant messaging group identifier includes:

querying whether the group mail address corresponding to the instant messaging group identifier exists; and if the group mail address corresponding to the instant messaging group identifier does not exist, creating a corresponding group mail address for the instant messaging group.

According to one or more embodiments of the present disclosure, there is provided a mail processing method, apparatus, and system, and the method includes:

obtaining the recipient identifier, where the recipient identifier includes multiple instant messaging group identifiers, or the recipient identifier includes a personal mail address and at least one instant messaging group identifier; and sending, based on the recipient identifier, a mail to a recipient indicated by the recipient identifier.

According to one or more embodiments of the present disclosure, there is provided a mail processing method, apparatus, and system. In the above method, the sending based on the recipient identifier, the mail to the recipient indicated by the recipient identifier includes:

sending, based on the recipient identifier, the mail to the group member indicated by the group identifier in the multiple instant messaging group identifiers, or sending, based on the recipient identifier, the mail to the group member indicated by the at least one instant messaging group identifier and to the personal mail address.

According to one or more embodiments of the present disclosure, there is provided a mail processing method, apparatus, and system. In the above method, the obtaining the input recipient identifier includes:

obtaining a character of the recipient identifier input by the user in real time; and requesting, according to the character input by the user, an instant messaging server to perform an identifier query, so as to request the instant messaging server to query a group identifier or a user identifier including the input character; and obtaining the group identifier or the user identifier fed back by the instant messaging server, and displaying the group identifier or the user identifier in association with the user input position.

According to one or more embodiments of the present disclosure, there is provided a mail processing method, apparatus, and system. In the above method, after displaying the group identifier or the user identifier in association with the user input position, the method further includes:

using, if a selection indication of the user is obtained, the group identifier or user identifier selected by the user as the recipient identifier; and obtaining, if the selection indication of the user is not obtained, the character of the recipient identifier subsequently input by the user, combining an obtained character with the character of the recipient identifier that was input before, and then returning back to perform an operation of requesting the instant messaging server to perform the identifier query.

According to one or more embodiments of the present disclosure, there is provided a mail processing method, apparatus, and system. In the above method, if there are multiple recipient identifiers, the mail servers to which the recipient identifiers belong are the same or different.

According to one or more embodiments of the present disclosure, there is provided a mail processing method, apparatus, and system. In the above method, the recipient identifier includes an instant messaging group identifier, and the sending, based on the recipient identifier, the mail to the recipient indicated by the recipient identifier includes:

sending the mail to a group mailbox indicated by the instant messaging group identifier, to enable the group mailbox to distribute the mail to a member mail addresses of the instant messaging group.

According to one or more embodiments of the present disclosure, there is provided a mail processing method, apparatus, and system. In the above method, the sending the mail to the group mailbox indicated by the instant messaging group identifier, to enable the group mailbox to distribute the mail to the member mail addresses of the instant messaging group includes:

sending the mail to the mail server, so that the mail server determines a group mail address according to the instant messaging group identifier, sends the mail to the group mail address, and distributes the mail to the member mail address of the instant messaging group.

According to one or more embodiments of the present disclosure, there is provided a mail processing method, apparatus, and system, and the method further includes: obtaining a group mail address corresponding to the instant messaging group identifier, and displaying the group mail address in the mail.

According to one or more embodiments of the present disclosure, there is provided a mail processing method, apparatus, and system. In the above method, the sending, based on the recipient identifier, the mail to the recipient address indicated by the recipient identifier includes:

performing a deduplication operation on the recipient address indicated by the recipient identifier, and sending the mail to a deduplicated recipient address.

According to one or more embodiments of the present disclosure, there is provided a mail processing method, apparatus, and system. In the above method, the performing the deduplication operation on the recipient address indicated by the recipient identifier includes:

determining a member included in the instant messaging group according to the instant messaging group identifier;

performing the deduplication operation based on a member identifier of the member; and determining a member mail address based on a deduplicated member identifier (ID).

According to one or more embodiments of the present disclosure, there is provided a mail processing method, apparatus, and system. In the above method, the performing the deduplication operation on the recipient address indicated by the recipient identifier includes:

determining, according to the instant messaging group identifier, a member included in the instant messaging group;

determining, based on the member identifier of the member, to member mail address; and performing the deduplication operation on the member mail address to obtain a deduplicated member mail address.

The above description is only a description of preferred embodiments of the present disclosure and applied technical principles. It should be understood by those skilled in the art that the disclosure scope involved in the present disclosure is not limited to the technical solution formed by the specific combination of the above technical features, but also covers other technical solutions formed by any combination of the above technical features or equivalent features thereof without departing from the above disclosure concept. For example, the technical solution formed by replacing the above features with the technical features with similar functions disclosed in, but not limited to, the present disclosure.

In addition, although the operations are depicted in a particular order, this should not be understood as requiring that the operations are performed in the particular order shown or in a sequential order. Under certain circumstances, multitasking and parallel processing may be advantageous. Similarly, although several specific implementation details are included in the above discussion, these should not be interpreted as limitations on the scope of the present disclosure. Certain features described in the context of separate embodiment may also be implemented in a single embodiment in combination. On the contrary, various features described in the context of a single embodiment can also be implemented in multiple embodiments individually or in any suitable sub-combination.

Although the subject matter has been described in language specific to structural features and/or logical acts of methods, it should be understood that the subject matter defined in the appended claims is not necessarily limited to the specific features or acts described above. On the contrary, the specific features and actions described above are merely exemplary forms for implementing the claims.

What is claimed is:

1. A mail processing method, comprising:
    receiving a to-be-sent mail;
    obtaining, if it is identified that the to-be-sent mail comprises an instant messaging group identifier, a group mail address corresponding to the instant messaging group identifier; and
    sending the to-be-sent mail to the group mail address;
    after it is detected that the group mail address receives the mail, determining, according to the instant messaging group identifier, member mail addresses of members in an instant messaging group corresponding to the instant messaging group identifier; and
    sending the received mail to the member mail addresses.

2. The method according to claim 1, wherein the determining, according to the instant messaging group identifier, member mail addresses of members in the instant messaging group corresponding to the instant messaging group identifier comprises:
    initiating, according to the instant messaging group identifier corresponding to the group mail address carried in the mail, a group member query request to an instant messaging server;
    receiving member identifiers of the members comprised in the instant messaging group fed back by the instant messaging server; and
    determining, according to the member identifiers, the member mail addresses of the members in the instant messaging group.

3. The method according to claim 1, wherein the determining, according to the instant messaging group identifier, the member mail addresses of the members in the instant messaging group corresponding to the instant messaging group identifier comprises:
    performing a deduplication operation on the member mail addresses;
    the sending the received mail to the member mail addresses comprises:
    sending the received mail to deduplicated member mail addresses.

4. The method according to claim 3, wherein the performing the deduplication operation on the member mail addresses comprises:
    determining, according to the instant messaging group identifier, the members comprised in the instant messaging group;
    performing the deduplication operation based on member identifiers of the members; and
    determining deduplicated member mail addresses based on deduplicated member identifiers.

5. The method according to claim 3, wherein the performing the deduplication operation on the member mail addresses comprises:

determining, according to the instant messaging group identifier, the members comprised in the instant messaging group;

determining, based on member identifiers of the members, the member mail addresses; and performing the deduplication operation on the member mail addresses to obtain deduplicated member mail addresses.

6. The method according to claim 1, wherein the obtaining the group mail address corresponding to the instant messaging group identifier comprises:

querying whether the group mail address corresponding to the instant messaging group identifier exists; and if the group mail address corresponding to the instant messaging group identifier does not exist, creating a corresponding group mail address for the instant messaging group.

7. The method according to claim 1, wherein the sending the received mail to the member mail addresses comprises:

in response to a case that a sender is a group member of the instant messaging group, blocking sending the to-be-sent mail to the sender.

8. The method according to claim 1, wherein the obtaining, if it is identified that the to-be-sent mail comprises the instant messaging group identifier, the group mail address corresponding to the instant messaging group identifier comprises:

obtaining, if the instant messaging group identifier is comprised in a body of the to-be-sent mail, the group mail address indicated by the instant messaging group identifier; and adding the group mail address indicated by the instant messaging group identifier to a recipient address.

9. The method according to claim 1, further comprising: during a user input process, automatically recommending a candidate instant messaging group identifier based on what is input by a user.

10. The method according to claim 9, further comprising:

invoking an automatic recommendation component in response to a specific prompt input by the user, wherein the automatic recommendation component automatically recommends, based on what is input by the user, the candidate instant messaging group identifier, for the user to select and input.

11. The method according to claim 9, wherein the candidate instant messaging group identifier has display information representing an instant messaging group.

12. The method according to claim 1, wherein:

the instant messaging group identifier is associated with a sender.

13. The method according to claim 1, wherein the group mail address is a hash address or the group mail address comprises a keyword corresponding to a group identifier.

14. The method according to claim 1, wherein the group mail address corresponds to the instant messaging group identifier one-to-one.

15. A mail processing method, comprising:

obtaining a recipient identifier, wherein the recipient identifier comprises multiple instant messaging group identifiers, or the recipient identifier comprises a personal mail address and at least one instant messaging group identifier; and sending, based on the recipient identifier, a mail to a recipient indicated by the recipient identifier;

wherein the sending, based on the recipient identifier, the mail to the recipient indicated by the recipient identifier comprises:

sending the mail to a group mailbox indicated by an instant messaging group identifier of the multiple instant messaging group identifiers or indicated by the at least one instant messaging group identifier, to enable the group mailbox to distribute the mail to member mail addresses of members of an instant messaging group corresponding to the instant messaging group identifier of the multiple instant messaging group identifiers or the at least one instant messaging group identifier.

16. The method according to claim 15, wherein the obtaining the recipient identifier comprises:

obtaining a character of the recipient identifier input by a user in real time;

requesting, according to the character input by the user, an instant messaging server to perform an identifier query, so as to request the instant messaging server to query a group identifier or a user identifier that comprise the character input by the user; and obtaining the group identifier or the user identifier fed back by the instant messaging server, and displaying the group identifier or the user identifier in association with a user input position.

17. The method according to claim 16, wherein the displaying the group identifier or the user identifier in association with the user input position comprises:

displaying the group identifier or the user identifier in an associated position of a recipient input column.

18. The method according to claim 16, after displaying the group identifier or the user identifier in association with the user input position, further comprising:

using, if a selection indication of the user is obtained, the group identifier or user identifier selected by the user as the recipient identifier; and obtaining, if the selection indication of the user is not obtained, the character of the recipient identifier subsequently input by the user, combining an obtained character with the character of the recipient identifier that was input before, and then returning back to perform an operation of requesting the instant messaging server to perform the identifier query.

19. The method according to claim 15, wherein if there are multiple recipient identifiers, the mail servers to which the recipient identifiers belong are the same or different.

20. The method according to claim 15, wherein the sending the mail to a group mailbox indicated by an instant messaging group identifier of the multiple instant messaging group identifiers or indicated by the at least one instant messaging group identifier, to enable the group mailbox to distribute the mail to member mail addresses of members an instant messaging group corresponding to the instant messaging group identifier of the multiple instant messaging group identifiers or the at least one instant messaging group identifier comprises:

sending the mail to a mail server, so that the mail server determines a group mail address according to the instant messaging group identifier of the multiple instant messaging group identifiers or the at least one instant messaging group identifier, sends the mail to the group mail address, and distributes the mail to the member mail addresses of the members of the instant messaging group.

21. The method according to claim 15, further comprising:

obtaining a group mail address corresponding to the group mailbox through the instant messaging group identifier of the multiple instant messaging group identifiers or the at least one instant messaging group identifier, and displaying the group mail address in the mail.

22. A device, comprising:

one or more processors;

a memory having stored thereon one or more programs; and the one or more programs, when executed by the one or more processors, cause the one or more processors to:

receive a to-be-sent mail;

obtain, if it is identified that the to-be-sent mail comprises an instant messaging group identifier, a group mail address corresponding to the instant messaging group identifier; and send the to-be-sent mail to the group mail address;

wherein the one or more programs, when executed by the one or more processors, further cause the one or more processors to:

in response to a case that a sender is a group member of an instant messaging group corresponding to the instant messaging group identifier, block sending the to-be-sent mail to the sender.

23. A device programed to execute the method according to claim 15, comprising:

one or more processors;

a memory having stored thereon one or more programs; and the one or more programs, when executed by the one or more processors, cause the one or more processors to implement said method.

24. A non-transitory computer readable storage medium programed to execute the method according to claim 1, having stored thereon a computer program which, when executed by a processor, implements said method.

25. A non-transitory computer readable storage medium programed to execute the method according to claim 15, having stored thereon a computer program which, when executed by a processor, implements said method.

* * * * *